United States Patent
Alsberg

[15] 3,697,494
[45] Oct. 10, 1972

[54] NON-CRAZING, BIAXIALLY ORIENTED STYRENE-METHYL METHACRYLATE COPOLYMER SHEETS

[72] Inventor: Henry Alsberg, Northbrook, Ill.

[73] Assignee: The Richardson Company, Melrose Park, Ill.

[22] Filed: Dec. 21, 1970

[21] Appl. No.: 99,810

[52] U.S. Cl..................................260/86.7, 264/289
[51] Int. Cl..............................................C08f 15/02
[58] Field of Search..........260/86.7, 93.5 A; 264/289

[56] References Cited

UNITED STATES PATENTS

| | | |
|---|---|---|
| 3,257,489 | 6/1966 | Heffelfinger...............264/289 |
| 3,393,185 | 7/1968 | Keskkula..................260/86.7 |
| 3,419,654 | 12/1968 | Chiba.......................264/210 |

*Primary Examiner*—Joseph L. Schofer
*Assistant Examiner*—C. A. Henderson, Jr.
*Attorney*—John L. Hutchinson and Alan M. Abrams

[57] ABSTRACT

Plastic sheets between 4 and 30 mils thickness comprising a biaxially oriented copolymer of about 55 to 80 percent styrene and 20 to 45 percent methyl methacrylate are characterized by an unexpected birefringence value, high impact strength and virtually no crazing cracks when fabricated into packages and containers.

2 Claims, 1 Drawing Figure

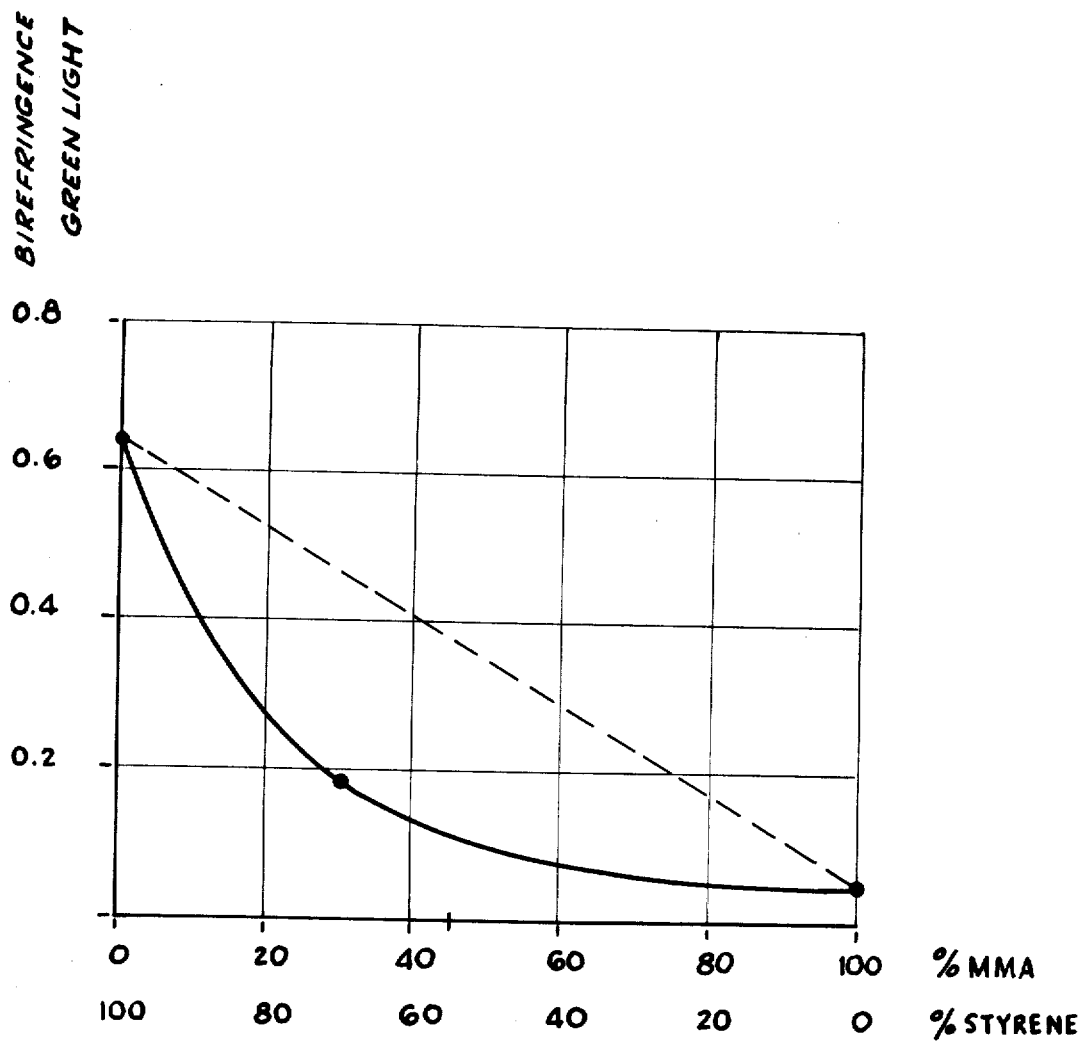

NON-CRAZING, BIAXIALLY ORIENTED STYRENE-METHYL METHACRYLATE COPOLYMER SHEETS

BACKGROUND OF THE INVENTION

This invention relates to sheet material found particularly suitable for packaging purposes and especially semi-rigid fabricated packages having extreme bends and folds. More specifically, a biaxially oriented sheet consisting of a copolymer of styrene and methyl methacrylate with a thickness of at least 4 mils has been found exceptionally free of crazing cracks when folded sharply. Its non-crazing characteristics, including low stress level, high impact strength, scratch resistance along with superior hand quality, make it a highly versatile and satisfactory packaging material.

In manufacturing fabricated semi-rigid packages, plastic sheets frequently used undergo scoring, bending and rolling to achieve a desired shape. However, severe bending of plastic sheets in many applications, for example in preparing display and gift boxes with 90° folds, cause crazing and cracking of the material, and thus, distort product visibility and decrease appeal of the enclosed product to the purchaser.

Biaxial orientation of various homopolymers such as poly (methyl methacrylate), poly (vinyl chloride and acetate) has been successful in overcoming crazing in molded and fabricated plastic containers and packages. Nevertheless, the above materials have not been entirely acceptable for such uses in all circumstances. Although generally more resistant to crazing, they are deficient in other essential properties rendering them less versatile for packaging articles. In many instances, sheets of the above-mentioned homopolymers do not possess adequate impact and tear resistance. In other cases, gel particles frequently found in poly (vinyl chloride) sheet would give poor clarity characteristics.

On the other hand, materials such as biaxially oriented polystyrene though demonstrating better impact and tear resistance than poly (methyl methacrylate), nevertheless, when folded sharply fails to provide acceptable resistance against crazing and cracking. Sharp or severe angles or folds as used herein denotes an angle generally from about 65° to 130° and more specifically at about 90°.

It has now been discovered that biaxially oriented sheets preferably between 4 and 30 mils and advantageously 10 to 20 mils thick comprising a copolymer of about 55 to 80 percent styrene and 20 to 45 percent methyl methacrylate and preferably 70 percent styrene and 30 percent methyl methacrylate have greater resistance to crazing and cracking when folded at severe angles. Unexpectedly, it has been found that release of stress on these sheets is optimal when birefringence is at a value of 0.1 to 0.3, and styrene and methyl methacrylate are used in the above percentage ranges. Markedly reduced stress release at these percentage ranges is surprising since polystyrene on one hand possesses a high birefringence value or high stress level, and thus, as previously indicated, has a tendency to craze, whereas poly (methyl methacrylate) is characterized by a rather low stress level, and therefore, is not apt to craze when folded. Accordingly, the stress level and resistance to to crazing of a copolymer of styrene and methyl methacrylate would be expected to be directly proportional to the concentration of methyl methacrylate present. That is, as the ratio of methyl methacrylate to styrene is increased, a steady, uniform decrease in the stress level of the sheet would be anticipated. However, instead of the expected linear lowering of the birefringence as the amount of methyl methacrylate is increased, it has been discovered that even with minor proportions of methyl methacrylate in the copolymer, a dramatic and rapid decrease in the stress level occurs. The optimal range of each monomer as mentioned above is from 55 to 80 percent styrene and 20 to 45 percent methyl methacrylate. Use of lesser amounts of methyl methacrylate monomer than expected not only assures a product of lesser cost, but also in terms of preferred properties provides a packaging material which is vastly superior in resistance to crazing, impact fractures and tearing.

Copolymers of biaxially oriented styrene and methyl methacrylate have been prepared heretofore. U.S. Pat. No. 3,393,185 to Keskkula et al. describes copolymer films of from 0.5 to 3 mils thick having 50 to 70 percent methyl methacrylate, and 30 to 50 percent styrene which are characterized by low noise level when flexed. Films described by Keskkula et al. are suggested for air tight packaging of produce and other articles where flexible shrink packaging materials are indicated. Unlike sheet compositions of the present invention, films of the prior art would not be used for thermoforming and semi-rigid packages. Moreover, in the use of films, stress problems involving crazing and fracture resistance do not arise as in the case of thicker, more rigid sheet materials of the present invention.

Accordingly, it is a principal object of the invention to produce a versatile plastic sheeting for semi-rigid containers and packages.

It is another principal object of the invention to provide biaxially oriented plastic sheet with an unexpected low stress birefringence value.

It is a further object of the invention to produce an oriented copolymer of styrene and methyl methacrylate in sheet form which is resistant to crazing when folded sharply.

Other objects, features and advantages of this invention will become apparent to those skilled in the art from the drawing and specification describing the invention in more detail hereinafter.

SUMMARY OF THE INVENTION

The random copolymers of the instant invention can be prepared by any number of known methods. In actual practice, various reaction systems including aqueous suspension, emulsion, solution and bulk processes can be employed. One process for preparation of the styrene/methyl methacrylate copolymer disclosed herein would be to suspend 55 to 80 percent styrene and 20 to 45 percent methyl methacrylate in water containing a suspending agent, adding a peroxide initiator, and polymerizing at about 190° F. The resulting copolymers should have an average molecular weight of about 50,000 to 400,000.

In developing oriented sheets of styrene/methyl methacrylate copolymer, calendering and extrusion are the principal methods of fabrication. Typically, the extruded copolymers are biaxially oriented by stretching in both directions using conventional methods. Flat sheet or tentering processes at temperatures ranging from 100° to 140° C. or bubble processing can be employed in which case the copolymer is extruded through a tube die, the tube is expanded around an air bubble to introduce transverse orientation. Other devices, such as the octagonal stretcher described in U.S. Pat. No. 2,779,053 may also be successfully used for biaxial orienting sheets of styrene/methyl methacrylate copolymers.

Various additives ordinarily used with styrene and acrylic polymers can be incorporated into the copolymer sheets herein disclosed, e.g. heat and UV stabilizers, antioxidants, plasticizers, coloring agents such as pigments and dyes, and the like.

As previously mentioned, oriented sheeting of the instant invention having a rather low concentration of methyl methacrylate quite unexpectedly was discovered to be highly resistant to crazing and impact, thus making it a desirable packaging material for fabricated semi-rigid containers. In addition, however, it may also be used in thermoforming processes for making molded articles. Furthermore, because of excellent clarity characteristics, it is also advantageously employed for document protection.

The following examples illustrate some of the embodiments of this invention. It is to be understood that these are for illustrative purposes only and do not purport to be wholly definitive as to conditions and scope.

EXAMPLE I

A reactor was charged with 1,000 lbs. of water and 6 lbs. of finely dispersed tricalcium phosphate. Then a mixture of 700 lbs. of styrene and 300 lbs. of methyl methacrylate, containing dissolved therein 2 lbs. of benzoyl peroxide and 0.2 lbs. of t-butyl peracetate, was added. The reactor was heated to 190° F. and maintained at this temperature until the suspended polymer spheres had become hard. Heating was then continued until a temperature of 250° F. was reached. After cooling the inorganic phosphate was removed by water washing. The polymer was then dried at 125° F. under full vacuum, and extruded in a conventional extruding machine at a barrel temperature of 400° F. to remove most of the volatile residues. Its melt flow was 1.2 g/10 min., as determined by ASTM D–1238, Condition N.

For orientation the polymer was re-extruded at the same temperature into a sheet which was then fed into an oven, containing a moving tentering frame. The tension of the tentering frame and the sheet transporting mechanism were so regulated as to cause an extension of the sheet of 200–300 percent in both the machine and transverse direction, while the oven was maintained at a temperature of 230°–290° F. A sheet of 4–20 mil thickness, depending on the starting thickness of the unoriented extrudate, was obtained.

EXAMPLE II

To determine the stress level of the copolymers of the invention, the birefringence of the biaxially oriented copolymer sheet of the invention was compared with the corresponding values obtained on similarly biaxially oriented polystyrene and polymethyl methacrylate sheets. The apparatus used was fashioned after that shown on page 534, Vol. 9, *Encyclopedia of Polymer Science and technology*. The samples were prepared by bevelling to expose a wedge. The light source used was monochromatic in the green area of the spectrum. First, the isoclinics were determined with a plane polaroscope. Then by inserting one quarter wave plates, a circular polaroscope was formed and the birefringence measured along the two principal optical axes.

The FIGURE shows the values obtained in relation to the composition of the samples. Due to the unexpected deviation from a straight line relationship, very low birefringence values were obtained for the copolymers of the present invention, providing values approaching those of polymethyl methacrylate. The low values are directly related to the low stress levels in the copolymer, and therefore, the observed excellent resistance to cracking and crazing.

EXAMPLE III

Samples of biaxially oriented polystyrene sheet of 12 mil thickness and similarly biaxially oriented copolymer sheet (70 percent styrene, 30 percent methyl methacrylate) of 12 mil thickness were prepared according to the method of Example I, both of which were then bent to about 180°. The sharply bent portions of each sheet were examined under a microscope at one hundred fold magnification, and the average number of cracks per unit length counted. The polystyrene sample was found to have an average of 11 cracks per 0.01 inch, while the copolymer sample of the present invention developed only an average of 1.5 cracks per 0.01 inch.

While the invention has been described in conjunction with specific examples thereof, this is illustrative only. Accordingly, many alternatives, modifications and variations will be apparent to those skilled in the art in light of the foregoing description, and it is therefore intended to embrace all such alternatives, modifications and variations as to fall within the spirit and broad scope of the appended claims.

I claim:

1. A semi-rigid biaxially oriented packaging sheet formed from a composition comprising a copolymer of about 55 to 80 percent styrene and 20 to 45 percent methyl methacrylate wherein said sheet is 4 to 30 mils thick having a birefringence value of about 0.1 to 0.3 and characterized by an absence of crazing cracks when folded at severe angles from above about 65°.

2. The packaging composition of claim 1 comprising a copolymer of about 70 percent styrene and 30 percent methyl methacrylate.

* * * * *